GEORGE STEVEN
ROY R. FRUEHAUF
INVENTORS

GEORGE STEVEN
ROY R. FRUEHAUF
INVENTORS

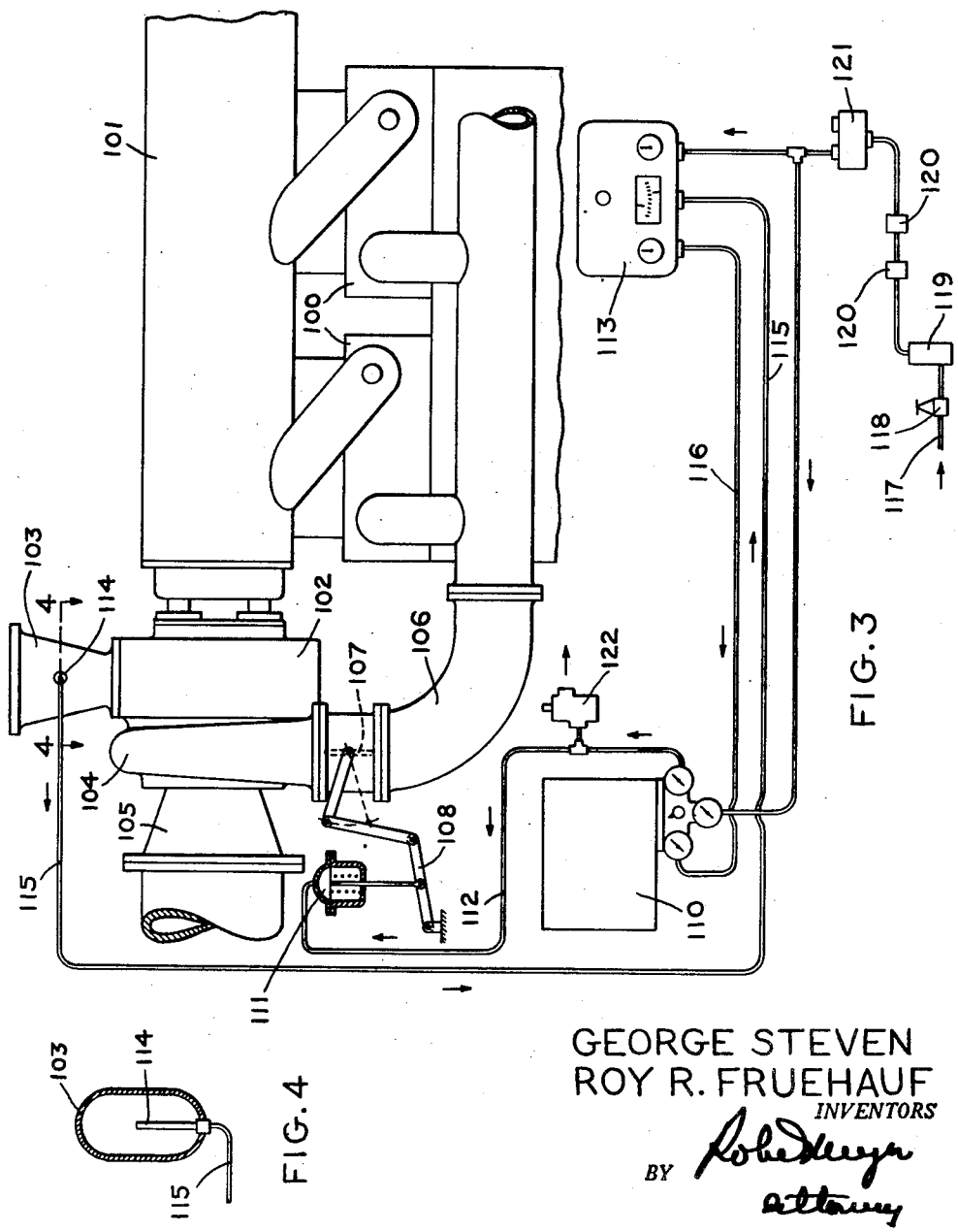

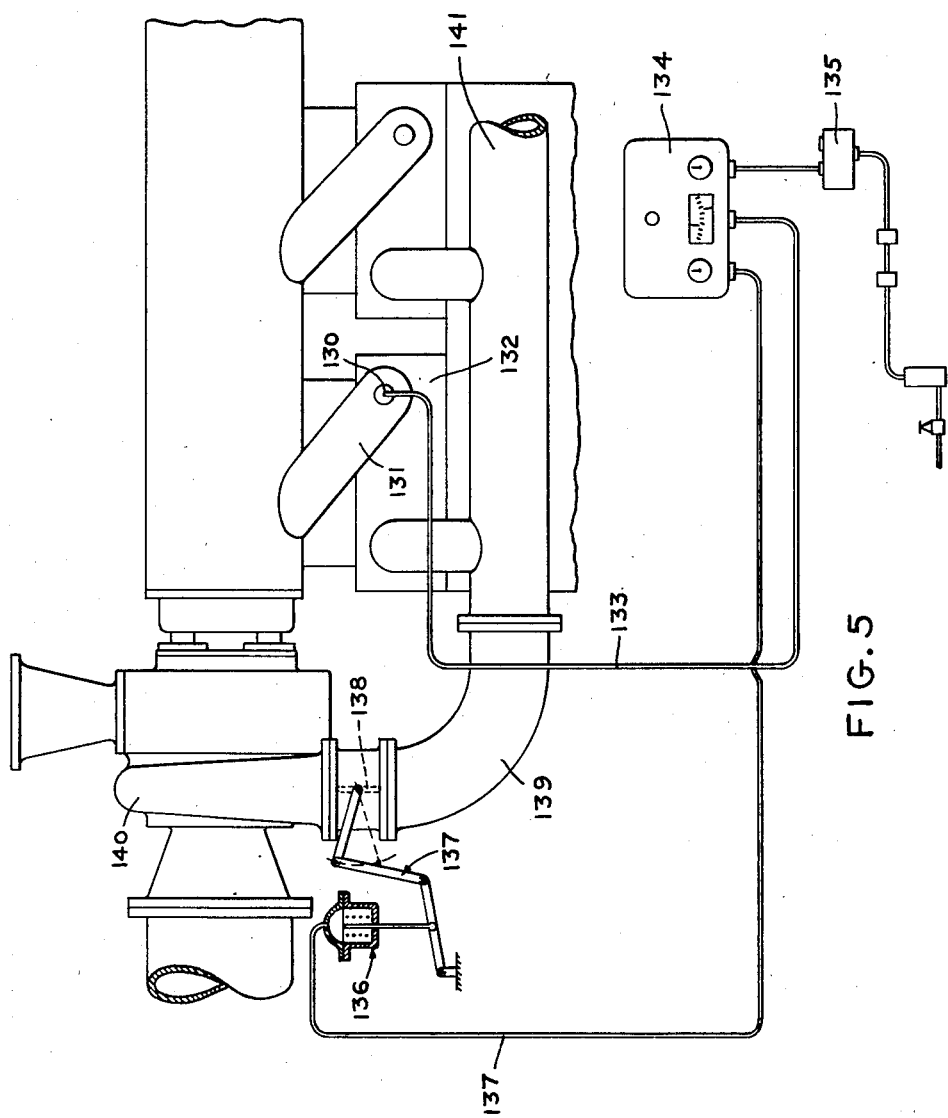

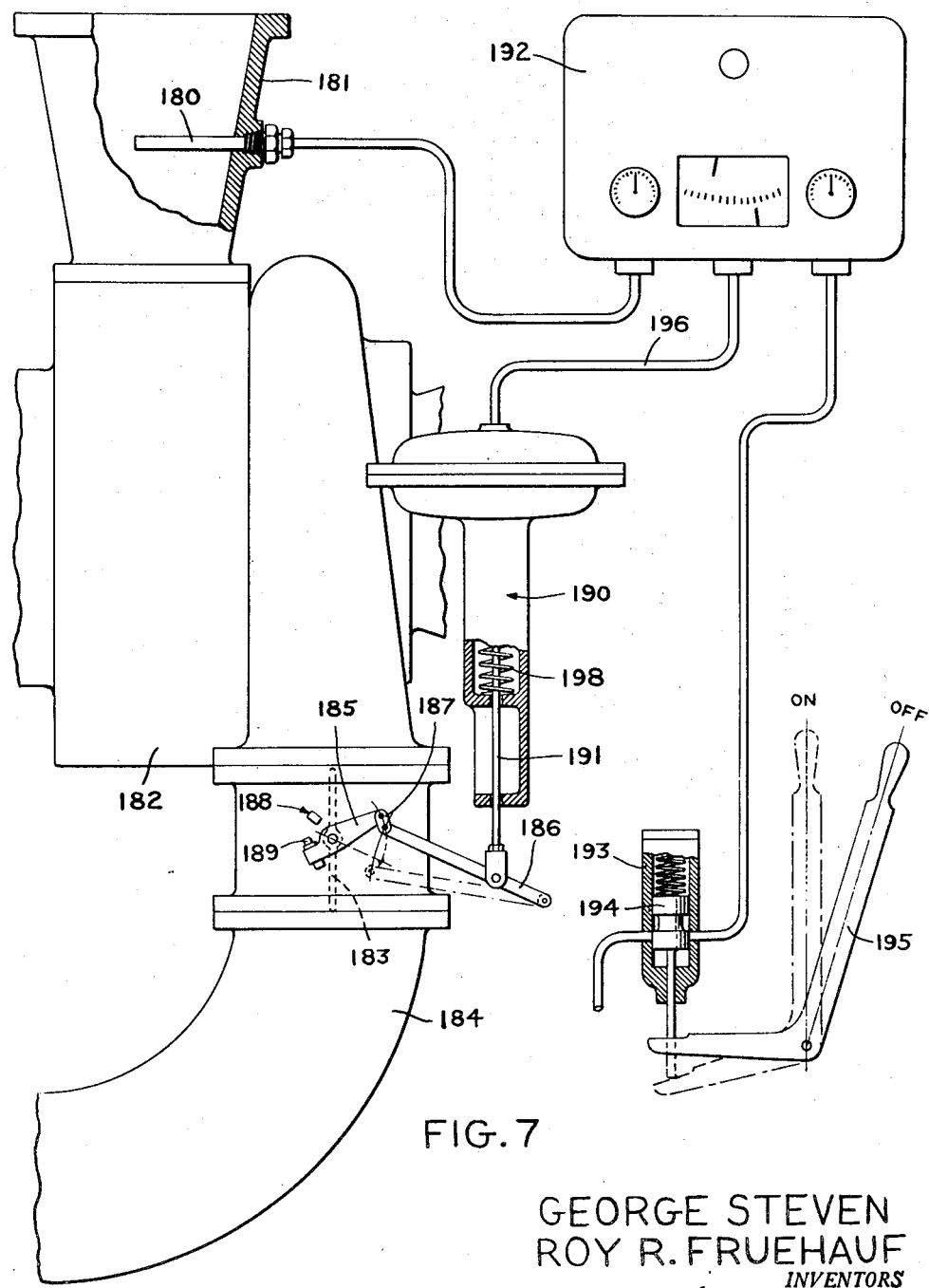

Patented July 3, 1951

2,558,884

UNITED STATES PATENT OFFICE 2,558,884

TEMPERATURE CONTROLLED AIR THROTTLING APPARATUS AND METHOD FOR CONTROLLING SUPPLY OF AIR TO INTERNAL-COMBUSTION ENGINES

George Steven, Kenmore, and Roy R. Fruehauf, Orchard Park, N. Y., assignors to Worthington Pump and Machinery Corporation, Harrison, N. J., a corporation of Delaware Application December 15, 1949, Serial No. 133,182

31 Claims. (Cl. 123—27)

1

This invention relates to internal combustion engines operating on a mixture of fuel gas and air, fuel oil and air, or a combination of both, either supercharged or naturally aspirated, compression ignition or spark ignition and more specifically to control of the air supplied to the engine for combustion.

In the operation of such engines over a range of load, the overall thermal efficiency at partial load is lower than at full load with the apparatus and methods now in use. This is an undesirable condition.

In order to improve the overall thermal efficiency that is obtained at partial load in an internal combustion engine operating on a mixture of air and gas fuel, we have found that it is necessary to control the amount of air and fuel gas entering the cylinder so that the proper ratio of combustion air to fuel gas by weight is maintained to maintain good combustion. The amount of gas fuel required by such an engine can be conveniently regulated by a governor controlled gas metering valve and the primary object of this invention is to provide a method and apparatus for controlling the combustion air supply so as to maintain the proper ratio of combustion air to fuel gas and furthermore to maintain this ratio regardless of the ambient air temperature.

The present invention provides control of the air delivered to the cylinders of an internal combustion enginge by novel means whereby the air supply to the engine is throttled, when the engine is operating at partial loads by a device which maintains the desired proper ratio of combustion air and fuel gas. A temperature sensitive element is placed in the common exhaust stack from all cylinders. This temperature sensitive element controls a throttle valve in the air supply pipe to the engine and changes in the exhaust temperature, due to load changes, adjusts the position of this throttle valve to control the air supply.

Another object of the present invention is to provide a safety device to prevent over-throttling of the air supply to the engine which is connected with the governor controlled mechanism for operating the gas metering valve.

With these and other objects in view, as may appear from the accompanying specifications, the invention consists of various features of construction and combination of parts, which will be first described in connection with the accompanying drawings, showing a temperature controlled air throttling apparatus and method for controlling

2 supply of air to internal combustion engines of a preferred form embodying the invention, and the features forming the invention will be specifically pointed out in the claims.

In the drawings:

Figure 3 is a schematic diagram showing the air-gas fuel ratio maintaining means associated with a supercharged gas-Diesel engine.

Figure 4 is a detail section on line 4—4 of Figure 3.

Figure 5 is a schematic diagram of a modification of the arrangement of the invention shown in Figure 3.

Figure 7 shows a simplified form of the invention wherein a manually operated lever is employed for controlling the supply of operating air to the thermally controlled air throttling valve.

Figures 1, 1A:
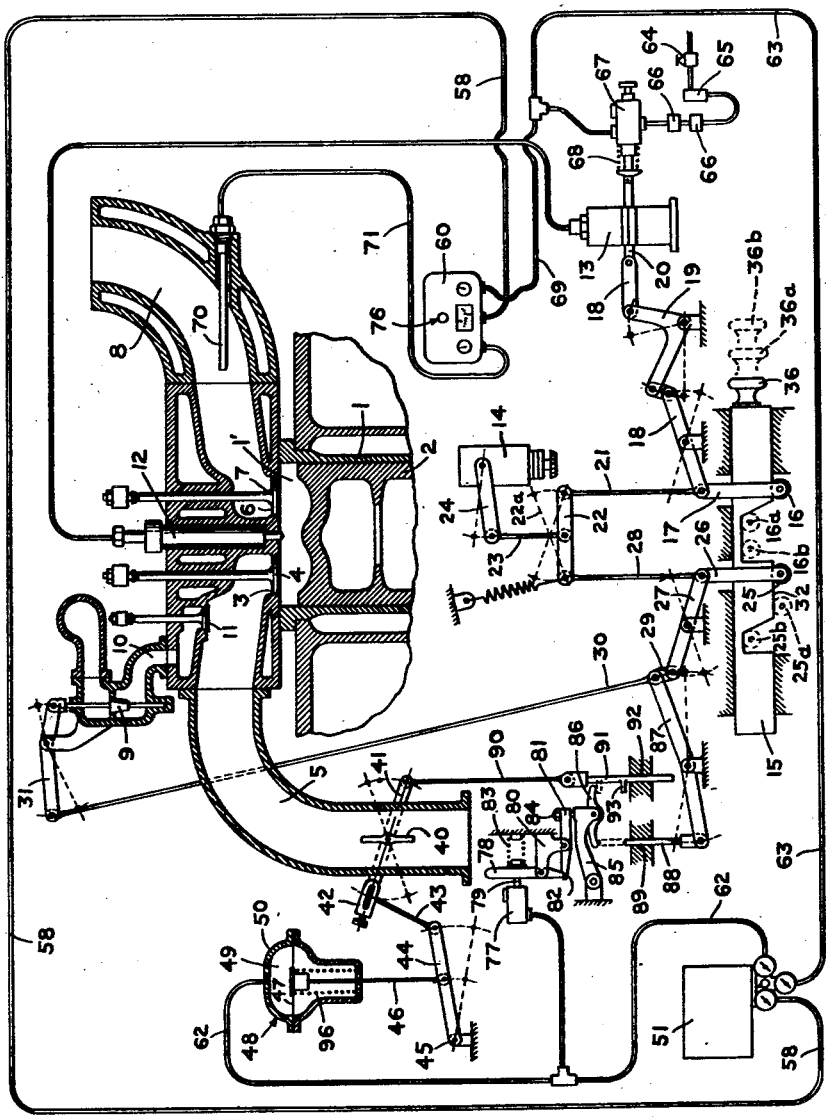
Figure 1 is a schematic diagram showing a part of a naturally aspirated gas Diesel engine in section together with the mechanism for automatically controlling air throttling to maintain a desired air-gas fuel ratio, of the fuel gas and air entering the engine cylinder, at all loads of the engine.
Figure 1a is a section through the safety bleed-off-valve.

Referring more particularly to the form of the invention shown in Figure 1, which shows a naturally aspirated dual fuel engine, capable of operating on a mixture of air and gas, air and fuel oil, or on a combination of gas, fuel oil and air, the engine includes the usual cylinder 1 in which the piston 2 reciprocates. The cylinder 1 has the air and gas fuel inlet port 3, communication of which with the combustion space 1' in the cylinder 1 is controlled by the intake valve 4 and which communicates with the air intake manifold 5. The exhaust port 6, which is controlled by the exhaust valve 7 communicates with the discharge manifold 8.

Gas fuel is delivered into the intake 5, through the gas metering valve 9 and passage 10 under control of the valve 11 while fuel oil, both for the pilot ignition charge, and for power charge is delivered to the cylinder 1 through the fuel injection o: spray valve 12.

Fuel and pilot ignition fuel oil is delivered to the injection or spray valve 12 by the fuel pump 13.

The operation of the fuel pump 13 and the gas metering valve 9 are under control of the engine governor 14 through the manually set control cam 15. The cam 15 is slidably supported for longitudinal movement and has an operating knob 36 thereon, although a lever may be connected to the cam for operating it if desired. A cam roller 16 engages the cam 15 and is carried by the fuel pump lever link 17 which is connected by a series of links 18 and a bell crank 19 to the fuel pump operating shaft 20. The fuel pump lever link 17 is connected by a rod or a governor fuel pump link 21 to the governor rocker lever 22. The governor rocker lever 22 is connected by a link 23 to the governor lever 24 which is connected to and operated by the governor 14.

A second cam roller 25 engages the cam bar 15 and it is carried by the control valve cam link 26. The end of the link 26 remote from the roller 25 is pivotally connected to a pivoted control valve cam lever 27 and to a link 28. The link 28 is connected to the end of the governor rocker lever 22 remote from the connection of the link 21 to the rocker lever. Links 29 and 30 connect the control valve cam link 27 to the pivoted control valve operating link 31 which is connected to the stem of the gas metering valve 9.

When the cam 15 is moved into the position indicated by the dotted position 36a of the knob 36 the roller 16 assumes the position 16a and the roller 25a, still on the maximum land 32 of the cam, at which time the mechanism is set for the engine to run with a fuel mixture of fuel oil and air, or as an oil or Diesel engine and the gas metering valve 9 will be held closed. When the cam 15 is moved into the position indicated by the dotted position 36b of the knob 36 the cam rollers 16 and 25 are moved into the dotted line positions 16b and 25b which places the gas metering valve 9 under control of the governor 14, as well as the fuel pump 13, and during such time as there is sufficient gas fuel to operate the engine to meet its load requirement, only a pilot ignition charge of oil is delivered to the injection or spray valve 12 and the engine operates as an oil ignited gas fuel engine, or a gas Diesel. However, when the supply of fuel gas is insufficient to meet the load demands on the engine then the governor acts to augment the gas fuel supply by a proportionate increase in the supply of fuel oil. Internal engines of this type and operating on the same principle showing slightly different control arrangements are shown in U. S. Patents 2,400,219 and 2,400,247, issued May 14, 1946.

The air intake manifold 5 has a valve 40, shown as a butterfly valve, mounted therein for controlling the quantity of air delivered through the inlet port 3 into the combustion space 1' of the cylinder 1.

The present invention relates to means for automatically operating this valve 40 to throttle or regulate the quantity of air passing to the combustion space 1'.

A butterfly valve lever 41 is connected intermediate its ends to the butterfly valve 40 and has an adjustable connection shown at 42 to a butterfly valve link 43.

The link 43 is connected to one end of a diaphragm motor lever 44 which is pivotally connected to a suitable support as shown at 45. A diaphragm motor link 46 is connected to the lever 44 intermediate its ends and connects the lever 44 to the spring tensioned diaphragm 47 of the diaphragm motor 48. The diaphragm 47 is subjected to pressure of air in the sealed chamber 49 of the casing 50 of the diaphragm motor 48 and air under pressure is delivered to the sealed chamber from a positioner 51.

Figure 2:
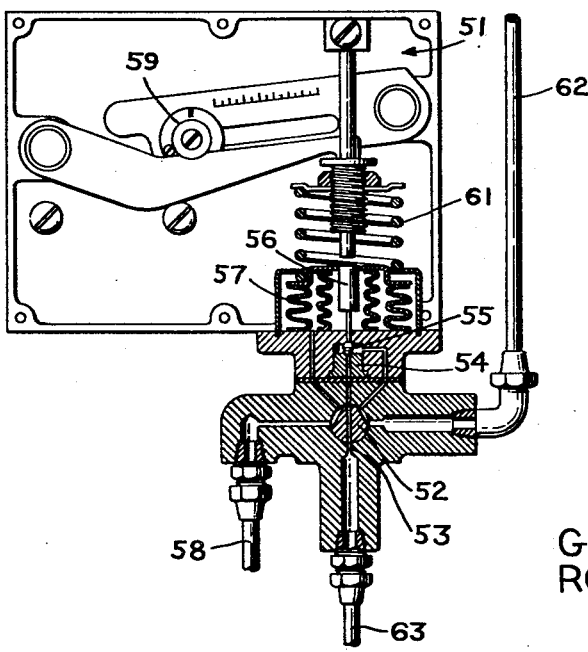
Figure 2 is a detail view showing in section the air operated positioner and diaphragm operated motor.

The positioner 51 (shown in detail in Figure 2 of the drawings) may be of any approved type which may be purchased upon the open market. However, that shown in Figure 2 of the drawings is a Moore valve positioner manufactured by the Moore Products Co.

The Moore positioner, being one form adaptable for use in the present invention, includes a casing having a manually set by-pass valve 52 therein which is provided with a passage 53 for the regulated air supply (hereinafter referred to) to the valve structure 54. The valve structure 54 includes a valve 55 which controls the passage of the regulated air from the by-pass valve 52, back to and through the by-pass valve 52 and thence into the conduit which leads it and delivers it into the sealed chamber 49 of the diaphragm motor 48. The stem 56 of the valve 54 extends into a bellows 57, engaging the closed top of the bellows 57 and the movement of the valve 54 is occasioned by movement of the bellows. The bellows is hollow and receives therein control instrument air delivered to the positioner 51 from the controller 60, through a suitable conduit 58 and the by-pass valve 54. A valve travel adjuster mechanism 59 is embodied in the positioner 51 to control travel of the valve 54.

The bellows 57 is spring loaded, by means of spring 61 to the same force as that exerted by the control instrument air pressure.

A rise or fall of control-instrument air pressure moves the bellows 57 and operates the valve 54 to control the delivery of air through the conduit 62 to the diaphragm motor 48. As the valve 54 moves, the balance spring load is changed. This action brings the bellows and valve 54 back to their original positions, thus restoring the balance between the spring loading and control instrument pressure.

Filtered and regulated air is delivered to the by-pass valve 52 through a suitable conduit 63.

The air supply for the filtered regulated air may be from any suitable source (not shown) such as starting air used to start the engine and it passes to the conduit 63 through a needle valve 64, an air filter 65, pressure reducing valves 66 and a control three-way valve 67.

The three-way control valve 67 is connected to and operated by the shaft 20 of the fuel oil pump 13, thus putting the control of delivery of pressure air to the positioner 51 and air vane controller 60 under control of the governor 14 of the engine. During the starting up period of the engine when the main fuel pumps are required or during operation of the engine on fuel oil as the main fuel supply the air supply to positioner 51 and controller 60 is shut off by the three-way valve 67 and thus prevented from reaching the diaphragm motor 48 and operating the butterfly valve 40. The three-way valve 67 is spring loaded by spring 68 and is held in open position as long as the fuel pump 13 is not delivering fuel oil and when the pump 13 is delivering oil the three-way valve 67 closes.

The three-way valve 67 controls the delivery of filtered and regulated air to the automatic controller 60 through the conduit 69.

This automatic controller 60 is a mechanism which measures the value of a variable quantity or condition and operates to correct it to a selected value and such controllers are well known and may be purchased upon the open market, such controllers being manufactured by The Bristol Company, Moore Products Co. and others.

In the application of the controller 60 in the present invention, it utilizes the temperature of the exhaust gases of the engine through a temperature sensitive element 70 (which also is well known and may be purchased upon the open market) mounted in the exhaust manifold 8. Variances in the temperature of the exhaust gases of the engine are transmitted as pressure by and through the temperature sensitive element 70 and its tube 71 to the controller 60 and acts as the control pressure which regulates the delivery of air from the conduits 69 through the controller 60 into the conduit 58 and consequently controls operation of the diaphragm motor 48 through the positioner 51. Thus the operation of the butterfly valve 40 is controlled by variances in the temperature of the exhaust gases of the engine to control the quantity of air delivered to the combustion chamber 1' in accordance with the load on the engine; since it has been found that there is a relation between the exhaust temperatures and the best engine performance at various loads the present air throttling control makes use of this characteristic.

The controller 60 includes a manually operated knob or button 76 by means of which the setting of the controller 60 may be adjusted, thus making it possible to automatically vary the load carrying capacity of the engine in direct relation to ambient temperatures and thus to compensate for daily and seasonal ambient air temperatures.

A safety device is provided to protect the engine against over-heating, the effects of over-throttling of the air supply or other undesirable conditions in the event the butterfly-valve operating mechanism or apparatus becomes disarranged, inoperative or does not operate properly.

The safety device or mechanism includes a bleed off valve 77 which is connected to the pressure chamber 49 in the diaphragm motor 48 so that when the valve 77 is open pressure air will be bled from the chamber 49 and the diaphragm motor 48 will operate to move the diaphragm motor lever 44 into its upper position as shown in solid lines in Figure 1 and open the butterfly valve 40 to full open position to permit a full charge of air to pass to the combustion chamber 1'.

The valve 77 is normally held closed by a latch 78 which engages the valve stem 79 and is pivotally supported by a suitable bracket 80. A latch rocker arm 81 is also pivotally supported intermediate its ends by the bracket 80 and its notched end 82 engages the latch 78 and holds it in valve closing position against the action of the spring 83. The latch rocker 81 has an adjustable contact 84 carried by its end remote from the notch 82 and this contact engages the free end of the pivotally mounted safety stop lever 85. A floating rocker 86 is pivotally connected intermediate its ends to the free end of the lever 85.

The gas control valve link or rod 30 has a pivotally mounted lever or arm 87 connected thereto, and a stop pin 88 is pivotally connected to the end of the lever 87 remote from its connection to the valve link 30. The stop pin 88 is guided by a suitable guide 89 for movement towards or from the floating rocker 86.

The butterfly valve lever 41 has a link 90 connected to its end remote from the adjustable connection 42 and a safety stop pin 91 is carried by the link 90 and guided for movement by a suitable guide 92. The safety stop pin 91 has a rocker engaging projection 93 formed thereon for engagement with the floating rocker 86.

The safety device operates as follows: when the engine is running on oil the air supply to the controller 60, positioner 51 and consequently to the diaphragm motor 48 is cut off as above described so that at such time all of these devices as well as the safety device are inoperative.

When the three-way valve 67 is operated by the fuel pump shaft 20 from the setting cam 15, to supply air to the controller 60 and positioner 51 at which time the engine is operating as a gas Diesel and the exhaust temperature control of the air supply control butterfly valve 40 is effective, the positions of the two stop pins 88 and 91 are regulated respectively by the positions of the gas metering valve 9 and the butterfly valve 40. In Figure 1 of the drawings these stop pins are shown in the positions assumed when the gas metering valve 9 is fully closed and the butterfly valve 40 is fully open.

As the gas metering valve opens the stop pin 88 approaches the rocker 86 and as the butterfly valve 40 closes the projection 93 on stop pin 91 approaches the rocker 86.

When the gas metering valve 9 and butterfly valve 40 assume predetermined relative positions the stop pin 88 and projection 93 move to the dotted line positions shown in Figure 1, i. e., into engagement with the rocker 86. Any further opening movement of the gas metering valve 9 and closing movement of the butterfly valve 40 will move the rocker 86 upwardly, rock the pivoted lever 85, which will in turn rock the latch rocker 81 and release the lower end of the pivoted latch 78. Upon release of the latch 78 by the latch rocker 81 the spring 83 will function to move the latch 78 and open the bleed off valve 77. Upon opening of the bleed off valve 77 pressure air will be bled from the diaphragm motor 48 and it will be rendered incapable of controlling movement of the butterfly valve, excepting only that its spring 96 will function to move the butterfly valve 40 into full open position. The engine will continue to operate, with a full charge of air going to it until the condition which has caused the tripping of the latch 78 has been corrected and the latch 78 reset manually.

In Figure 3 of the drawings the temperature controlled air throttling apparatus for controlling supply of air to an internal combustion engine is shown applied to a supercharged gas-Diesel or a dual fuel internal combustion engine.

In this form of the invention the exhaust gases from the engine cylinder 100 passes into the exhaust manifold 101 and from thence into an exhaust gas driven turbine 102 of any suitable construction. The exhaust gas driven turbine exhausts or discharges into an exhaust outlet 103 and it drives a centrifugal compressor or blower 104 which receives its inlet air through its inlet 105, compresses the air to a predetermined pressure and discharges it into the inlet manifold 106 of the cylinders 100 to provide supercharging of the engine.

The flow of the compressed supercharging air to the engine cylinders 100 is throttled or controlled by a butterfly valve 107 placed in the connection between the compressor 104 and the inlet manifold 106. While the butterfly valve 107 is shown in the drawings between the compressor 104 and the inlet manifold 106, it is obvious that it could be placed in the suction or inlet of the compressor 104 and provide equal desired control of the air.

Operation of the butterfly valve 107 is controlled by the temperature of the exhaust gases in the exhaust outlet 103 for controlling the quantity delivery of air to the cylinders 100 in substantially the same manner as the butterfly valve 40 is operated in the form of the invention shown in Figure 1 of the drawings. That is, the butterfly valve 107 is connected by a series of links and a lever 108 to a diaphragm motor 109 which is is the same as the diaphragm motor 48. Operation of the diaphragm motor 109 is controlled by the control delivery of air thereto by a positioner 110, which delivers operating air to the pressure chamber 111 of the diaphragm motor 109 through a conduit 112. The controller 113, which is the same as the controller 60 of Figure 1 of the drawings varies the pressure of air supplied or delivered thereto from any suitable source of pressure air (not shown), such as the starting air supply of the engine, in accordance with variances in the temperature of the exhaust gases leaving the exhaust gas driven turbine 102 through its exhaust passage 103. A thermal element 114, of any suitable type which may be purchased upon the open market, is inserted into the exhaust passage 103 and is connected to the controller 113 through the connection tube 115.

Variances in the exhaust gas temperature are transmitted as pressure by and through the temperature sensitive element 114 and its tube 115 to the controller 113 and acts as the control pressure which regulates or controls the delivery of air from the pressure air supply source (not shown) through the controller 113 and conduit 116 to the air operated positioner 110 and consequently controls the operation of the diaphragm motor 111 and the butterfly valve 107. Thus the supply of air delivered to the combustion chambers of the engine cylinders 100 is controlled or regulated by variances in the temperature of the exhaust gases of the engine.

The pressure air is delivered to the controller 113 through a suitable conduit 117 in which is interposed a needle valve 118, an air filter 119, and pressure reducing valves 120.

The delivery of air to the controller 113 through the conduit 117 is controlled by a three-way valve 121 which is of the same construction as the three-way valve 67 shown in Figure 1 of the drawings, and it is operated by the governor (not shown) of the engine in the same manner described in connection with the structure shown in Figure 1 to render the controller 113 inoperative during operation of the engine as a straight Diesel engine, i. e., during operation on fuel oil and air.

A two-way normally closed valve 122 is shown connected in the air line 112 from the positioner 110 to the diaphragm motor 111, and this valve acts as a mechanically actuated by-pass valve to by-pass air flowing from the positioner to the diaphragm motor 111 to prevent operation of the diaphragm motor at certain times. The valve 122 is operated by a safety device such as shown in Figure 1 and described in connection therewith to provide a safety control over operation of the butterfly valve 107 in the same manner and for the same purposes as the safety control of the butterfly valve 40 is provided in the structure shown in Figure 1.

Figure 5 of the drawings shows a modification of the structure shown in Figure 3 and in this form of the invention the thermal element or temperature sensitive element 130 is placed in the exhaust passage 131 of the last stage cylinder 132 of the engine structure and has its tubing 133 connected to the controller 134.

The controller 134 is the same as the controllers 113 and 60 and it varies the pressure of the pressure air delivered thereto through the three-way valve 135 from the supply source (not shown) of pressure air in accordance with temperature variances of exhaust gases in the exhaust passage 131, through operation of the temperature sensitive element 130. The three-way valve 135 is under control of the engine governor (not shown) the same as the three-way valves 121 and 67.

In the present modification of the invention, the controlled air is delivered from the controller 134 directly to the diaphragm motor 136 through a suitable conduit 137, and the air operated positioner shown in Fig. 3 is eliminated.

The air operated diaphragm motor 136 is connected by suitable leverage 137 to the butterfly valve 138 located in the inlet passage or connection 139 between the air compressor 140 and the intake manifold 141 of the engine and thus the quantity of air supplied to the cylinders of the engine is controlled by load variances on the engine as expressed in temperature variances of the exhaust gas from one of the cylinders of the engine.

Figure 6:
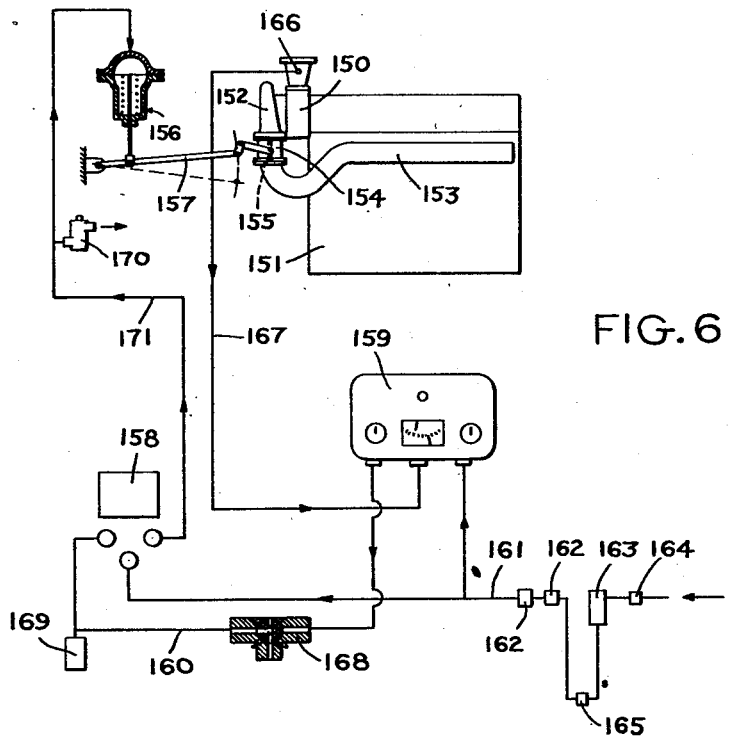
Figure 6 is a schematic diagram of another modified form of the invention showing a manually operated selector valve for cutting the thermal control into or out of operation.

The structure or system shown in Figure 6 of the drawings shows a still further modification of the invention. Like the structures and systems shown in Figures 3 and 5 of the drawings this form shows a super-charged dual fuel engine including a turbine 150 operated by exhaust gases from the engine 151 and in turn operating a compressor or blower 152 which delivers air to the intake manifold 153 of the engine through a connection 154. The quantity of air delivered from the compressor 152 to the intake manifold 153 is under control of a butterfly valve 155 interposed in the connection 154. The butterfly valve 155 is operated by a diaphragm motor 156 through suitable lever connection 157. Pressure air for operating the diaphragm motor 156 is delivered thereto through a positioner 158 which is the same as the positioner 51 of Figure 1 and operates in the same manner. Controlled air is delivered to the positioner 158 from a controller 159 (which is the same as controller 60 of Figure 1) through a suitable conduit 160. Pressure air from any suitable source (not shown) such as the air starting supply for starting the engine is delivered to the controller 159 through a conduit 161 in which is interposed reducing valves 162, a filter 163, needle valve 164 and a drain pet cock 165. The pressure air delivered to the controller 159 is regulated in accordance with load demands on the engine by the controller through the medium of the temperature sensitive element 166 and its tubing 167. The temperature sensitive or thermal element 166 transmits variances in exhaust temperature of the engine exhaust gases to the controller 159 as pressure variances and the controller acts to vary or control the delivery of pressure air therefrom to the positioner 158 in accordance with the variances in pressure delivered thereto from the thermal element 166.

The conduit 160 has a manually actuated three-way selector valve 168 connected therein which is manually operated to open the air passage through the selector valve to atmosphere or exhaust when the engine is running on fuel oil and air, at which time control of the quantity of air delivered to the intake manifold 153 by the compressor is not under control of operation of the diaphragm motor 156 and its associated cooperating mechanisms, since delivery of operating air thereto is cut off by the positioning of the selector valve 168.

When the engine is operating as a gas Diesel engine, i. e., with gas as fuel, the valve 168 is manually operated to convey air from the controller 159 to the positioner 158 and thence to the diaphragm motor 156, thus putting the delivery of air to the manifold 153 under control of temperature variances of the exhaust gases of the engine, and consequently varying the air quantity delivered in accordance with variations in load on the engine.

If desired, a capacity tank 169 may be connected in the conduit 160 between the selector valve 168 and positioner 158 to correct the controlled air system to a minimum predetermined quantity, as for instance, one hundred (100) cubic inches.

Also, if desired, a safety valve 170 may be connected in the air supply line or conduit 171 between the positioner 158 and diaphragm motor 156 and operated by safety mechanism as shown in Figure 1 to provide the safety factor and features as are shown and described in connection with the form of the invention shown in Figure 1.

Figure 7 of the drawings shows a simplified, modified form of the invention which is manually controlled and is adaptable for use on oil fuel, or gas fuel Diesel engines or dual fuel engines, super-charged or naturally aspirated.

While in this form of the invention Figure 7 shows the thermal or temperature sensitive element 180 extending into the exhaust outlet 181 of the exhaust gas driven turbine 182, it is to be understood that it may be inserted into an exhaust pipe of the engine (not shown) as shown in Figure 5 of the drawings, of either a super-charged or naturally aspirated engine.

In this form of the invention, a butterfly valve 183 is mounted in the air delivery pipe 184 which delivers air to the combustion chambers (not shown) of the engine cylinders for controlling the quantity of air delivered to the combustion chambers.

The butterfly valve 183 has an actuating arm 185 connected thereto which is in turn connected to a pivoted lever 186 by suitable linkage as shown at 187. A stop 188 is provided which cooperates with an adjustable stop pin 189 to limit the movement of the arm 185 and consequently lmit movement of the butterfly valve 183.

A diaphragm motor unit 190 has its operated rod 191 connected to the lever 186 for operating the lever and the butterfly valve 183. The diaphragm motor 190 receives controlled operating pressure air from a controller 192, which is the same as the controller 60 shown and described in connection with Figure 1.

Pressure air from any suitable source (not shown) is supplied or delivered to the controller 192, under control of a manually operated valve 193.

The valve 193 is shown in the drawings as a spring loaded plunger type valve, in which the plunger 194 is moved by a manually operated pivoted lever 195, but any suitable type of manually operated valve may be substituted therefor, for example, the three-way selector valve 168 as shown in Figure 6.

The pressure air flows into the controller 192, wherein it is controlled or regulated in accordance with variances in the exhaust temperature of the engine, through the medium of the temperature sensitive element 180 in the same manner that the diaphragm operating air is controlled in the structure shown in Figure 1.

From the controller 192, the controlled air passes through a suitable line or conduit 196 to the pressure chamber 197 of the diaphragm motor 190 and operates the motor in accordance with variances in the temperature of the exhaust gases from the engine. Since the diaphragm motor 190 operates the butterfly valve 183 the quantity of air delivered to the combustion chambers (not shown) of the cylinders of the engine will be regulated by variances in the temperature of the exhaust gases of the engine, and accordingly with the load demand on the engine, when the hand lever 195 is in "on" position.

When the hand lever 195 is in "off" position, flow of pressure air to the controller 192 and consequently to the diaphragm motor 190 will be cut off and the butterfly valve 183 will be held in full open position by the spring 198 of the diaphragm motor 190.

It will be understood that the invention is not to be limited to the specific construction or arrangement of parts shown, but that they may be widely modified within the invention defined by the claims.

What is claimed is:

1. In an internal combustion engine including a governor and having an exhaust outlet and an intake manifold, a valve for controlling delivery of air to the intake manifold, means sensitive to variances in temperature of exhaust gases in said exhaust outlet, pressure air operated means operated by operation of said temperature sensitive means for operating said valve to control the quantity of air delivered to said intake manifold and a valve controlled by operation of the governor of the engine for controlling delivery of pressure air to said pressure operated means.

2. In an internal combustion engine having an exhaust outlet and an intake manifold, a valve for controlling delivery of air to the intake manifold, means sensitive to variances in temperature of exhaust gases in said exhaust outlet, and means operated by operation of said temperature sensitive means for operating said valve to control the quantity of air delivered to said intake manifold, and means for rendering said valve operating means ineffective to operate said valve at predetermined times.

3. An internal combustion engine as claimed in claim 1 wherein said valve operating means includes means for moving said valve into full open position when the valve operating means is ineffective to operate the valve.

4. The combination with an internal combustion engine having an exhaust outlet and an intake manifold, of a valve for controlling delivery of air to the intake manifold, a pressure air operated motor for operating said valve, means for delivering pressure air to said motor, a controller for correcting and selecting the pressure of the air delivered to said pressure air operated motor, and means sensitive to variances in temperature of exhaust gases in said exhaust outlet for operating said controller to vary the pressure of air delivered to said air motor in accordance with variances in the temperature of the exhaust gases, and a valve for cutting off delivery of pressure air to said controller at predetermined operating conditions of the engine.

5. The combination claimed in claim 4 including means for rendering said pressure air operated motor ineffective to operate said valve, and means for moving said valve into full open position when the pressure air operated motor is ineffective to operate said valve.

6. The combination as claimed in claim 4, including a governor for the engine, a valve for controlling delivery of pressure air to said control and means connecting the governor and said pressure air control valve for operating the valve to cut off delivery of pressure air to the pressure air operated motor at predetermined times during operation of the engine.

7. The combination as claimed in claim 4 including a valve for cutting off the delivery of pressure air to said pressure air operated motor to render it ineffective to operate said inlet air control valve, and means for operating said valve.

8. The combination as claimed in claim 4 including a second valve for cutting off the delivery of pressure air to said pressure air operated motor to render it ineffective to operate said inlet air control valve, means for operating said second valve, and means incorporated in said pressure air delivering means to render the air motor ineffective.

9. The combination as claimed in claim 4 including an air delivery line between said controller and pressure air operated motor, a safety bleed-off valve in said air delivery line, and means for opening said safety bleed-off valve to prevent delivery of operating pressure air to said pressure air operated motor.

10. The combination as claimed in claim 4 including an air delivery line between said controller and pressure air operated motor, a safety bleed-off valve in said air delivery line, means for opening said safety bleed-off valve to prevent delivery of operating pressure air to said pressure air operated motor, and means for moving the inlet air control valve into full open position when said safety bleed-off valve is open.

11. The combination as claimed in claim 4 including a valve for cutting off the delivery of pressure air to said pressure air operated motor to render it ineffective to operate said inlet air control valve, means for operating said valve, an air delivery line between said controller and pressure air operated motor, a safety bleed-off valve in said air delivery line, and means for opening said safety bleed-off valve to prevent delivery of operating pressure air to said pressure air operated motor.

12. The combination as claimed in claim 4 wherein said means for delivering pressure air to said pressure air operated motor includes a pressure air operated positioner to regulate the delivery of pressure air to said motor.

13. The combination as claimed in claim 4 wherein said means for delivering pressure air to said pressure air operated motor includes a pressure air operated positioner to regulate the delivery of pressure air to said motor, a valve interposed between said controller and said positioner for cutting off delivery of pressure air to said positioner to render said pressure air operated motor ineffective to operate said intake air control valve.

14. The combination as claimed in claim 4 wherein said means for delivering pressure air to said pressure air operated motor includes a pressure air operated positioner to regulate the delivery of pressure air to said motor, a valve interposed between said controller and said positioner for cutting off delivery of pressure air to said positioner to render said pressure air operated motor ineffective to operate said intake air control valve, and means for moving said intake air control valve into full open position when the pressure air operated motor is ineffective to operate the valve.

15. The combination as claimed in claim 4 wherein said means for delivering pressure air to said pressure air operated motor includes a pressure air operated positioner to regulate the delivery of pressure air to said motor, an air delivery line between said positioner and said pressure air operated motor, a safety bleed-off valve in said air delivery line, and means for opening said safety bleed-off valve to prevent delivery of operating pressure air to said pressure air operated motor.

16. The combination as claimed in claim 4 wherein said means for delivering pressure air to said pressure air operated motor includes a pressure air operated positioner to regulate delivery of pressure air to said motor, a valve interposed between said controller and said positioner for cutting off delivery of pressure air to said positioner to render said pressure air operated motor ineffective to operate said intake air control valve, an air delivery line between said positioner and said pressure air operated motor, a safety bleed-off valve in said air delivery line, and means for opening said safety bleed-off valve to prevent delivery of operating pressure air to said pressure air operated motor.

17. The combination as claimed in claim 4, including a governor for the engine, a valve for controlling delivery of pressure air to said control, means connecting the governor and said pressure air control valve for operating the valve to cut off delivery of pressure air to the pressure air operated motor at predetermined times during operation of the engine, and wherein said means for delivering pressure air to said pressure air operated motor includes a pressure air operated positioner to regulate the delivery of pressure air to said motor.

18. The combination as claimed in claim 4 including adjustable stop means for limiting movement of said inlet air control valve.

19. The combination with a dual fuel internal combustion engine including an exhaust outlet, a fuel pump for feeding fuel oil to the engine, a metering valve for controlling feeding of gas fuel to the engine, a valve for controlling delivery of combustion air to the engine, a pressure air operated motor for operating said combustion air control valve, means for delivering pressure air to said motor, a controller for varying the pressure of the air delivered to said pressure air operated motor, means sensitive to variances in the temperature of exhaust gases in said exhaust outlet for operating said controller to vary the pressure of air delivered to said air motor in accordance with variances in the temperature of the exhaust gases, an air delivery line between said controller and said pressure air operated motor, a safety bleed-off valve in said air delivery line, means connected to said gas metering valve and means connected to said combustion air inlet control valve cooperating with the means connected to said gas metering valve for controlling opening of said bleed-off valve.

20. The combination as claimed in claim 19 including means for moving said combustion air control valve into full open position when said bleed-off valve is open.

21. The combination with a dual fuel internal combustion engine including an exhaust outlet, a fuel pump for feeding fuel oil to the engine, a metering valve for controlling feeding of gas fuel to the engine, a valve for controlling delivery of combustion air to the engine, a pressure air operated motor for operating said combustion air control valve, means for delivering pressure air to said motor, a controller for varying the pressure of the air delivered to said pressure air operated motor, means sensitive to variances in the temperature of exhaust gases in said exhaust outlet for operating said controller to vary the pressure of air delivered to said air motor in accordance with variances in the temperature of the exhaust gases, an air delivery line between said controller and said pressure air operated motor, a safety bleed-off valve in said air delivery line, means connected to said gas metering valve and means connected to said combustion air inlet control valve cooperating with the means connected to said gas metering valve for controlling opening of said bleed-off valve, and a valve operated by operation of said fuel pump for controlling delivery of pressure air to said controller.

22. The combination with a dual fuel internal combustion engine including an exhaust outlet, a fuel pump for feeding fuel oil to the engine and a metering valve controlling feeding of gas fuel to the engine, of a valve for controlling delivery of combustion air to the engine, a pressure air operated motor for operating said valve, means for delivering pressure air to said motor, a controller for varying the pressure of the air delivered to said pressure air operated motor, means sensitive to variances in the temperature of exhaust gases in said exhaust outlet for operating said controller to vary the pressure of air delivered to said air motor in accordance with variances in the temperature of the exhaust gases of the engine, a valve for controlling delivery of pressure air to said controller and from thence to said pressure air operated motor, a governor for said engine, means connecting said governor said fuel pump and said gas metering valve for controlling the delivery of fuel oil or fuel gas to the engine, and means operated upon operation of the governor associated means to shift the engine from gas fuel to oil fuel for cutting off the delivery of air to said controller when the engine is shifted to run on oil fuel.

23. The combination with a dual fuel internal combustion engine including an exhaust outlet, a fuel pump for feeding fuel oil to the engine and a metering valve controlling feeding of gas fuel to the engine, of a valve for controlling delivery of combustion air to the engine, a pressure air operated motor for operating said valve, means for delivering pressure air to said motor, a controller for varying the pressure of the air delivered to said pressure air operated motor, means sensitive to variances in the temperature of exhaust gases in said exhaust outlet for operating said controller to vary the pressure of air delivered to said air motor in accordance with variances in the temperature of the exhaust gases of the engine, a valve for controlling delivery of pressure air to said controller and from thence to said pressure air operated motor, a governor for said engine, means connecting said governor said fuel pump and said gas metering valve for controlling the delivery of fuel oil or fuel gas to the engine, means operated upon operation of the governor associated means to shift the engine from gas fuel to oil fuel for cutting off the delivery of air to said controller when the engine is shifted to run on oil fuel, and means for moving said compression air inlet control valve into full open position when the engine is operated on oil fuel.

24. The method of controlling the delivery of combustion air to an internal combustion engine in accordance with the load demand on the engine, which embodies controlling the delivery of combustion air to the engine by pressure air, regulating the pressure of said control pressure air in accordance with variances in the temperature of exhaust gases of the engine, and controlling the delivery of pressure air in accordance with operating conditions of the engine.

25. The method of controlling the delivery of combustion air to an internal combustion engine in accordance with the load demand on the engine, which embodies controlling the delivery of combustion air to the engine by pressure air, and regulating the pressure of said controlling pressure air in accordance with variances in the temperature of exhaust gases of the engine, cutting off the controlling action of the controlled pressure air at predetermined times, and supplying a full charge of combustion air to the engine when said control pressure air is cut off.

26. The combination as claimed in claim 4 including means for varying the setting of the controller to vary the load carrying capacity of the engine in direct relation to ambient temperatures.

27. The combination as claimed in claim 1 including a safety device for relieving said pressure air motor of operating air pressure at predetermined conditions of operation of the engine to permit full supply of air to the engine.

28. The combination as claimed in claim 4 wherein manually operated means is provided for operating said valve for cutting off delivery of pressure air to said controller.

29. The combination as claimed in claim 4 wherein means actuated by the governor of the engine is provided for operating said valve for cutting off delivery of pressure to said controller.

30. The combination as claimed in claim 19 including means for varying the load carrying capacity of the engine in direct relation to ambient temperatures.

31. The combination as claimed in claim 22 including means for varying the setting of said controller to vary the load carrying capacity of the engine in direct relation to ambient temperatures.

GEORGE STEVEN.
ROY R. FRUEHAUF.

REFERENCES CITED

The following references are of record in the file of this patent:

UNITED STATES PATENTS

| Number | Name | Date |
|---|---|---|
| 1,189,786 | Byrnes | July 4, 1916 |
| 2,400,247 | Miller et al. | May 14, 1946 |
| 2,504,243 | Anderson | Apr. 18, 1950 |